(12) United States Patent
Farler

(10) Patent No.: US 10,064,413 B1
(45) Date of Patent: Sep. 4, 2018

(54) CAKE SURFACING DEVICE

(71) Applicant: Deborah Farler, Lawton, OK (US)

(72) Inventor: Deborah Farler, Lawton, OK (US)

( * ) Notice: Subject to any disclaimer, the term of this patent is extended or adjusted under 35 U.S.C. 154(b) by 0 days.

(21) Appl. No.: 15/664,000

(22) Filed: Jul. 31, 2017

(51) Int. Cl.
| | | |
|---|---|---|
| *A21D 13/00* | (2017.01) | |
| *A21C 15/00* | (2006.01) | |
| *A47G 19/26* | (2006.01) | |
| *A23G 3/28* | (2006.01) | |
| *A23G 3/02* | (2006.01) | |
| *A47G 21/04* | (2006.01) | |
| *A21D 13/13* | (2017.01) | |
| *B05C 11/04* | (2006.01) | |
| *A47G 21/14* | (2006.01) | |
| *B05C 13/00* | (2006.01) | |
| *A23P 20/15* | (2016.01) | |

(52) U.S. Cl.
CPC ............ *A21C 15/002* (2013.01); *A21D 13/13* (2017.01); *A23G 3/02* (2013.01); *A23G 3/28* (2013.01); *A47G 19/26* (2013.01); *A47G 21/045* (2013.01); *A23P 20/15* (2016.08); *A47G 21/145* (2013.01); *B05C 11/04* (2013.01); *B05C 11/041* (2013.01); *B05C 13/00* (2013.01)

(58) Field of Classification Search
CPC .......... A21C 15/002; A23G 3/02; A23G 3/28; A21D 13/13; B05C 11/04; B05C 11/041; B05C 11/044; B05C 13/00; A47G 19/26; A47G 21/045; A47G 21/145; A47G 19/022; A23P 20/15
USPC ...................................... 118/13, 14
See application file for complete search history.

(56) References Cited

U.S. PATENT DOCUMENTS

| | | | | |
|---|---|---|---|---|
| 2,303,116 | A | * 11/1942 | Engle ..................... | A47J 43/282 30/114 |
| 2,530,910 | A | * 11/1950 | Schnabel ............... | A47G 19/26 312/284 |
| 2016/0205953 | A1 | * 7/2016 | Nguyen .................. | A23P 20/15 |

* cited by examiner

*Primary Examiner* — Laura E Edwards
(74) *Attorney, Agent, or Firm* — Jerry D Haynes; Law Office of Jerry D Haynes, PA

(57) ABSTRACT

A cake surfacing device that includes: a base; a pedestal extending vertically from the base; a turn table at the top of the pedestal adapted to receive a cake; an arm support extending from the pedestal; a swivel arm attached to the arm support, where the swivel arm includes a connecting end; a plastic container, where the plastic container surrounds the cake; and a surfacing blade within the plastic container where the surfacing blade extends from a top center of the plastic container to one side of the plastic container. The turn table is preferably adapted to rotate. The swivel arm includes a connecting end with a connecting pin, where the connecting pin engages the plastic container. The plastic container includes a connecting crown which receives the connecting pin.

6 Claims, 1 Drawing Sheet

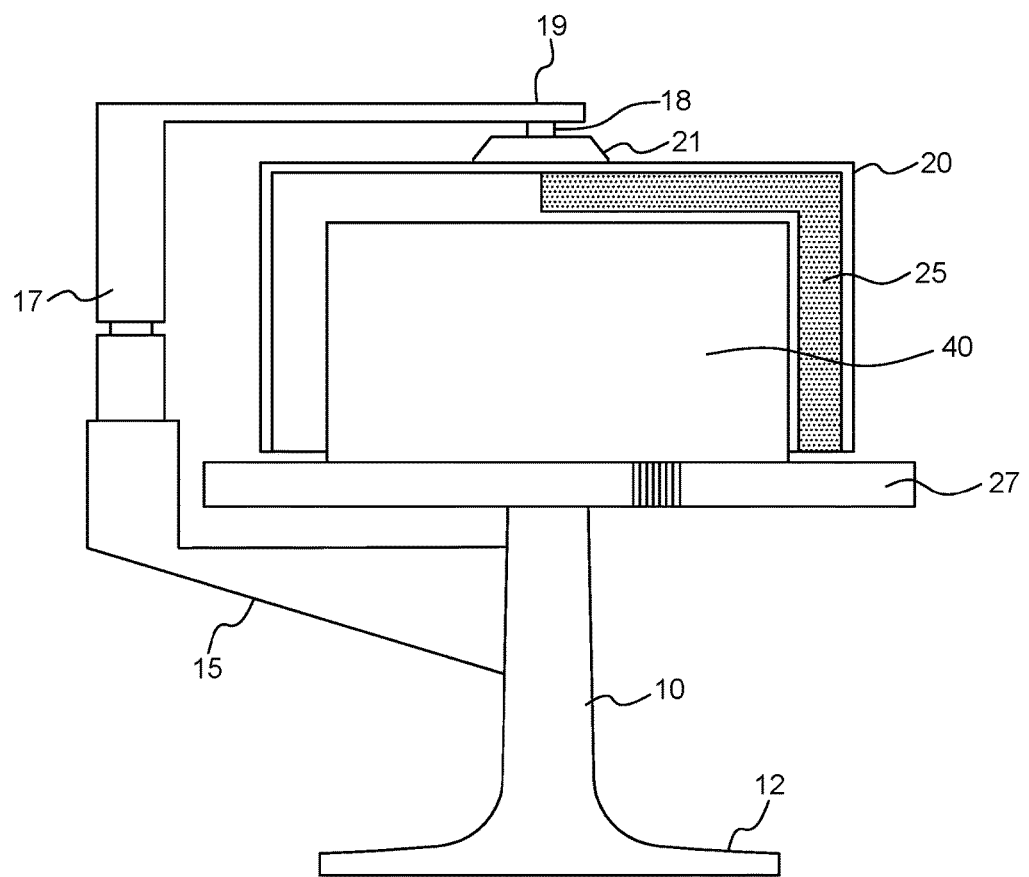

CAKE SURFACING DEVICE

BACKGROUND OF THE INVENTION

Field of Invention

The present invention relates to a cake surfacing device that ensures that a smooth surface is provided over a finished cake.

Description of Related Art

Bakeries of course make many varieties of cakes and pastries for consumers. It is well known that cake is a common dessert and includes a sugary breading with a icing applied over the breading providing a usually delicious tasty edible item. Cakes are made in various forms and shapes and sizes. A common cake is usually two layers of breading or cake portions with icing applied over the layers. Typically the icing is applied in various forms and it is usually pleasing aesthetically to have a smooth surface to the icing to appeal to the visual aspects of the cake. Further normally the cake is round circular disc like and sliced for serving at the completion.

As stated it is advantageous to have a smooth surface of the cake for aesthetic purposes therefore it would be ideal to have a convenient device that could easily smooth the icing surface of the cake.

SUMMARY OF THE INVENTION

The present invention relates to a cake surfacing device that includes: a base; a pedestal extending vertically from the base; a turn table at the top of the pedestal adapted to receive a cake; an arm support extending from the pedestal; a swivel arm attached to the arm support, where the swivel arm includes a connecting end; a plastic container, where the plastic container surrounds the cake; and a surfacing blade within the plastic container where the surfacing blade extends from a top center of the plastic container to one side of the plastic container. The turn table is preferably adapted to rotate. The swivel arm includes a connecting end with a connecting pin, where the connecting pin engages the plastic container. The plastic container includes a connecting crown which receives the connecting pin.

BRIEF DESCRIPTION OF DRAWINGS

FIG. 1 depicts a cake surfacing device according to the present invention.

DETAILED DESCRIPTION

The present invention relates to a cake surfacing device that provides a blade that is transferred over the surface of the cake to smooth the surface for an even texture. The surfacing device includes a base with a pedestal, wherein a turntable is provided at the top of the pedestal. During use a cake is placed on top of the pedestal and enclosed in a plastic container. Within the plastic container is a blade that extends from the top of the plastic container down one side of the plastic container that essentially travels over the surface of the cake, which is rotated on top of the turntable once within the plastic container. A swivel arm is provided that attaches to the top of the plastic container to allow for circular movement of the container and braces the container in a stable position, where the cake is rotated with the turntable.

In reference to FIG. 1, a cake surfacing device according to present invention is depicted. This cake surfacing device includes a Base 12 with a Pedestal 10. On top of the Pedestal 10 is a Turntable 27, which is adapted to receive a Cake 40. A cross-sectional view is provided of a Plastic container 20 and a Cake 40. This cross-sectional view reveals a Blade 25 within the Plastic container 20 that extends from the top center of the Plastic container 20 along to one side of the Plastic container 20. Once the Cake 40 is placed on the Turntable 27 it may be rotated in order to smoothly surface the icing on top of the Cake 40. The turntable 27 and plastic container 20 may be fabricated in various sizes ranging from 2 inches to 12 inches.

Other aspects of the surfacing device include a Swivel Arm 17 is placed into an Arm Support 15 that in turn is attached to the Pedestal 10. The Swivel Arm 17 includes a Connecting End 19 that connects to the top of the Plastic container 20. The Connecting End 19 includes a Connecting Pin 18 that goes into a Connecting Crown 21 provided at the top of the Plastic container 20. This enclosure therefore provides a support and stabilization in the Plastic container 20 and allows for the rotation of the Turntable 27. The Turntable 27 is adapted to support the cake and support the rotation of the cake within the Plastic container 20.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A cake surfacing device comprising:
   a. a base;
   b. a pedestal extending vertically from the base;
   c. a turn table at the top of the pedestal adapted to receive a cake;
   d. an arm support extending from the pedestal;
   e. a swivel arm attached to the arm support, where the swivel arm includes a connecting end;
   f. a plastic container, where the plastic container surrounds the cake; and
   g. a surfacing blade within the plastic container where the surfacing blade extends from a top center of the plastic container to one side of the plastic container.

2. The cake surfacing device according to claim 1, where the turn table is adapted to rotate.

3. The cake surfacing device according to claim 1, where the swivel arm includes a connecting end with a connecting pin.

4. The cake surfacing device according to claim 3, where the connecting pin engages the plastic container.

5. The cake surfacing device according to claim 4, where the plastic container includes a connecting crown which receives the connecting pin.

6. The cake surfacing device according to claim 1, where the surfacing blade includes a straight edge.

* * * * *